United States Patent [19]

Sowell

[11] 4,228,917

[45] Oct. 21, 1980

[54] GASKET FOR YARN SPINNING PACK

[75] Inventor: Lyles H. Sowell, Old Hickory, Tenn.

[73] Assignee: E. I. Du Pont de Nemours and Company, Wilmington, Del.

[21] Appl. No.: 36,540

[22] Filed: May 7, 1979

[51] Int. Cl.³ .............................................. B65D 53/00
[52] U.S. Cl. ................................ 220/378; 277/206 R; 277/170; 277/236
[58] Field of Search ................ 220/378, 240; 277/205, 277/206, 170, 236

[56] References Cited

U.S. PATENT DOCUMENTS

| 1,519,111 | 12/1924 | Brownell | 277/206 X |
| 1,918,443 | 7/1933 | Baash | 277/206 X |
| 2,980,284 | 4/1961 | Gill et al. | 220/240 |

Primary Examiner—George T. Hall

[57] ABSTRACT

The addition of a circumferential groove in the inner peripheral surface of the ring gasket made of cold-flowable metal induces diametrical expansion of the gasket during compression.

1 Claim, 5 Drawing Figures

GASKET FOR YARN SPINNING PACK

BACKGROUND OF THE INVENTION

This invention relates to pressure seals and more particularly to the gasketing of joints in high pressure equipment with ring-type gaskets.

In the melt spinning of polymers it is customary to force the molten polymer under high pressure through a filter to remove particles which might clog the spinneret or impair the quality of the yarn. At these high pressures difficulty has been encountered in finding adequate means for sealing the filter assembly to prevent polymer leaks.

Gill et al. in their U.S. Pat. No. 2,980,284 propose the use of a band-type gasket which requires very little compressive force for a satisfactory seal. As they state, gaskets which seal by being compressed between two parts are not satisfactory because at high polymer pressures the degree of compression required to hold the gasket in place is excessive and even with higher compressive force these gaskets frequently fail.

SUMMARY OF THE INVENTION

An effective compression ring-type gasket has been provided to overcome this problem. The gasket is made of cold-flowable material and has an inner peripheral surface that includes a circumferential groove. This structural arrangement facilitates the outward diametrical expansion of the ring as it is being compressed between the two parts forming the seal.

In the preferred embodiment of the invention the circumferential groove has a semicircular cross section and the ring gasket is tetra-sided.

DETAILED DESCRIPTION OF THE PREFERRED EMBODIMENT

Figure 1:
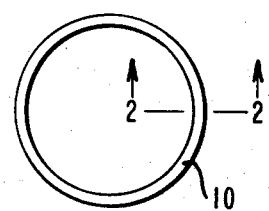
FIG. 1 is a top view of a preferred gasket of this invention.
Figure 2:
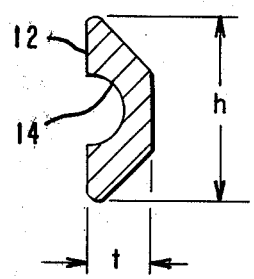
FIG. 2 is a cross sectional view taken along line 2—2 of FIG. 1.

Referring now to FIGS. 1 and 2, the gasket 10 of this invention is shown to be in the form of a continuous ring of metal that will cold flow when compressed. Suitable metals are aluminum, copper, and bronze. The height of this particular gasket is indicated by (h) and the cross sectional thickness by (t). The gasket has four sides and the side forming the inner peripheral surface 12 has a circumferential groove 14 formed therein.

Figure 3:
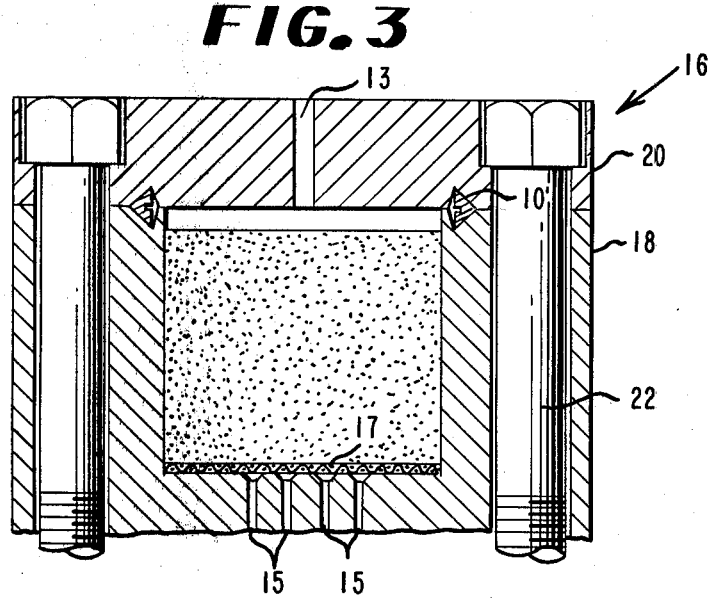
FIG. 3 illustrates the functioning of the gasket of this invention in a container.
Figure 4:
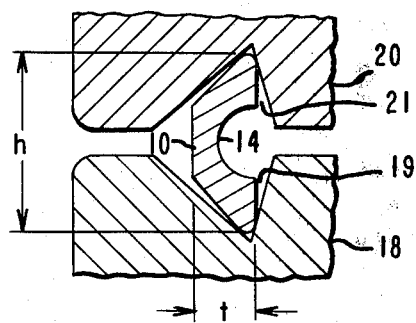
FIG. 4 shows the position of the gasket in the container groove after closing the container but before the application of compression force to the gasket.
Figure 5:
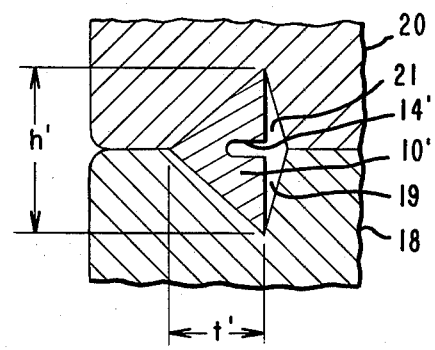
FIG. 5 shows the position of the gasket of FIG. 4 and its extent of outward diametrical expansion after a compressive force is applied.

FIGS. 3–5 illustrates the functioning of this gasket in a container designed for filtering polymer preparatory to spinning the polymer into fibers. The container 16 comprises a body 18 and a lid 20 which is releasably joined to the body by threaded bolts 22. In this application of the container the body cavity contains sand as a filter medium. Polymer is admitted to the container through conduit 13 and emitted through conduits 15. Screen 17 prevents entrainment of sand. There are matching annular V-shaped grooves 19,21 in the juncture surfaces of the body and lid respectively which form a chamber for the gasket 10.

It is essential that the gasket height h be greater than the combined depth of V-shaped grooves 19,21 to permit compression of the gasket before the lid and body juncture surfaces meet. Referring to FIGS. 4 and 5 it can be seen that as the ring gasket 10 is compressed between lid 20 and body 18 outward diametrical expansion of gasket 10 increases the thickness t to t' while reducing the height h to h'. The groove 14 facilitates outward diametrical expansion of the ring gasket 10 and as the gasket is deformed it is wedged into the triangular chamber formed by V-shaped grooves 19,21 in the lid and the body of the container increasing the sealing contact area of the gasket.

The pressure seal of this invention is particularly effective in the melt spinning of polymers, but it may be used to advantage in many applications where sealing at high pressures and temperatures is required.

I claim

1. In a polymer filter that includes a body and a lid joined together at juncture surfaces, said surfaces having matching annular V-shaped grooves forming a chamber, the improvement comprising a ring gasket of cold-flowable metal in said chamber, said ring gasket having an inner peripheral surface that includes a circumferential groove, and a height greater than the combined depth of the V-shaped grooves whereby the gasket is compressed when said lid and said body are joined together and said gasket permanently increases in thickness as its height is reduced.

* * * * *